United States Patent [19]

Learn

[11] 4,231,583
[45] Nov. 4, 1980

[54] PROJECTABLE STEP FOR VEHICLES

[76] Inventor: William H. Learn, 402 Frederick Street, Hanover, Pa. 17331

[21] Appl. No.: 44,085

[22] Filed: May 31, 1979

[51] Int. Cl.³ .............................................. B60R 3/02
[52] U.S. Cl. .................................... 280/166; 105/445
[58] Field of Search .................. 280/166, 164, 764; 105/444, 445, 446, 447, 448; 182/88, 89

[56] References Cited

U.S. PATENT DOCUMENTS

| | | | |
|---|---|---|---|
| 2,118,557 | 5/1938 | Hamilton | 280/166 |
| 3,329,443 | 7/1967 | Lowder et al. | 280/166 |
| 3,762,742 | 10/1973 | Bucklen | 280/166 |
| 4,073,502 | 2/1978 | Frank et al. | 280/166 |

Primary Examiner—David M. Mitchell
Attorney, Agent, or Firm—C. Hercus Just

[57] ABSTRACT

A step for a vehicle pivotally supported by the chassis frame thereof and movable between extended operative and retracted inoperative positions, vacuum mechanism being used to retract the step and a spring moves the same to extended position. A latch releasably secures the step in the extended position and the vacuum mechanism initially unlatches the latch prior to the vacuum moving the step to retracted position.

10 Claims, 6 Drawing Figures

PROJECTABLE STEP FOR VEHICLES

BACKGROUND OF THE INVENTION

The present invention pertains to a step which is movably supported relative to a selected side of an automotive vehicle such as a camper, van, and other similar types of vehicles in which the bottom of the door opening of the cab or body is substantially higher than the sill of a normal passenger-type automobile, whereby it is difficult for many types of persons to readily step from the ground or roadway into the door opening. Auxiliary or supplemental types of steps for this type of vehicle have been devised heretofore. One example of such prior steps is illustrated in U.S. Pat. No. 3,329,443 to Lowder et al, dated July 4, 1976, and in which a step is simply pivotally supported by an L-shaped arm that is manually movable between an extended and a retracted position, the step being held selectively in said alternate positions by spring actuated detents engaging suitable stop members on a bracket which supports the L-shaped arm.

A further type of auxiliary step which is power-operated is illustrated in U.S. Pat. No. 3,762,742 to Bucklen, dated Oct. 2, 1973. A pivoted arm is moved between extended and retracted positions by an electric motor which operates a screw which extends through a pivotally mounted nut member interconnected to the arm of the step for purposes of moving it respectively in opposite directions as aforesaid, depending upon the direction in which the screw is rotated.

Still another type of auxiliary step comprises the subject matter of later U.S. Pat. No. 4,073,502 to Frank et el, dated Feb. 14, 1978, and in which a horizontal step is supported by two sets of parallel arms which depend from a bracket secured to the side of a van or the like, adjacent the sill of a door, a vacuum unit being employed normally to maintain the step in retracted position, and spring means move the step to extended position, whereby when the engine of the vehicle is not running, there is no vacuum to maintain the step in retracted position and said springs automatically move the step to extended or operative position.

The purpose of the present invention is to provide improvements over said prior devices, particularly to render the same safe in operation and for other purposes set forth hereinbelow.

SUMMARY OF THE INVENTION

It is among the principal objects of the present invention to provide an auxiliary step for an automotive vehicle, such as a van, camper, or other similar vehicle, said step being pivotally mounted for purposes of enabling the same to be swung from a retracted position beneath the sill of the door of such vehicle, to an extended position in which it is projected beyond the sill and below the same to provide ease of access to the relatively high sill, the pivot for said arm being substantially at an acute angle to the vertical and supported by a bracket connected to a side chassis member of the vehicle, the outer end of said arm having a step or tread member detachably connected thereto, said arm being normally maintained when the engine of the vehicle is running by vacuum which holds the arm in said retracted position, and a spring being operable to project said arm to dispose the tread in operative position when the engine is stopped or when the door of the vehicle is open while the engine is running, and a latch being operable when the arm and step are in projected position to maintain the same in said position safely and securely but said latch being moved to disengaging position when the engine of the vehicle is running and the door is moved to closed position, whereby said vacuum then will move the arm and step to said retracted, inoperative position thereof.

It is another object of the invention to mount said latch means in one of two selected positions respectively designed to enable the supporting mechanism for the arm and step to be mounted as desired on either side of a vehicle.

It is a further object of the invention to form said arm from a plurality of parts which are capable of being arranged for adjusted position to dispose the step selectively in either a desired extent of projection, or a desired elevation, depending upon how the parts of said arm are connected.

It is still another object of the invention to associate said latch with said pivoted arm in such manner that the plunger rod of the vacuum cylinder is connected at one end to the latch member, which, in turn, is pivotally connected to the arm adjacent the pivoted end of said arm, whereby operation of the arm is effected through said latch member for purposes of effecting operation of said latch in unlatching direction, as well as incidentally moving the arm to projected position by the spring which is operable upon the end of the plunger rod which is within the vacuum cylinder and thereby effect maintenance of the latch member in latching condition incident to moving the arm to extended operative position. Details of the foregoing objects and of the invention, as well as other objects thereof are set forth in the following specification and illustrated in the accompanying drawings comprising a part thereof.

DETAILED DESCRIPTION OF THE DRAWINGS

FIG. 1 is a fragmentary perspective view, showing the projectable step comprising the subject matter of the invention associated with a door and door opening of an automotive vehicle, the auxiliary step of the invention being illustrated in operative position in full lines and, in phantom, being shown in exemplary retracted, inoperative position.

FIG. 2 is an enlarged, fragmentary, partially vertical sectioned elevation of the step and supporting mechanism shown in FIG. 1, as seen on the line 2—2 thereof.

DETAILED DESCRIPTION OF THE INVENTION

Figures 1, 2:
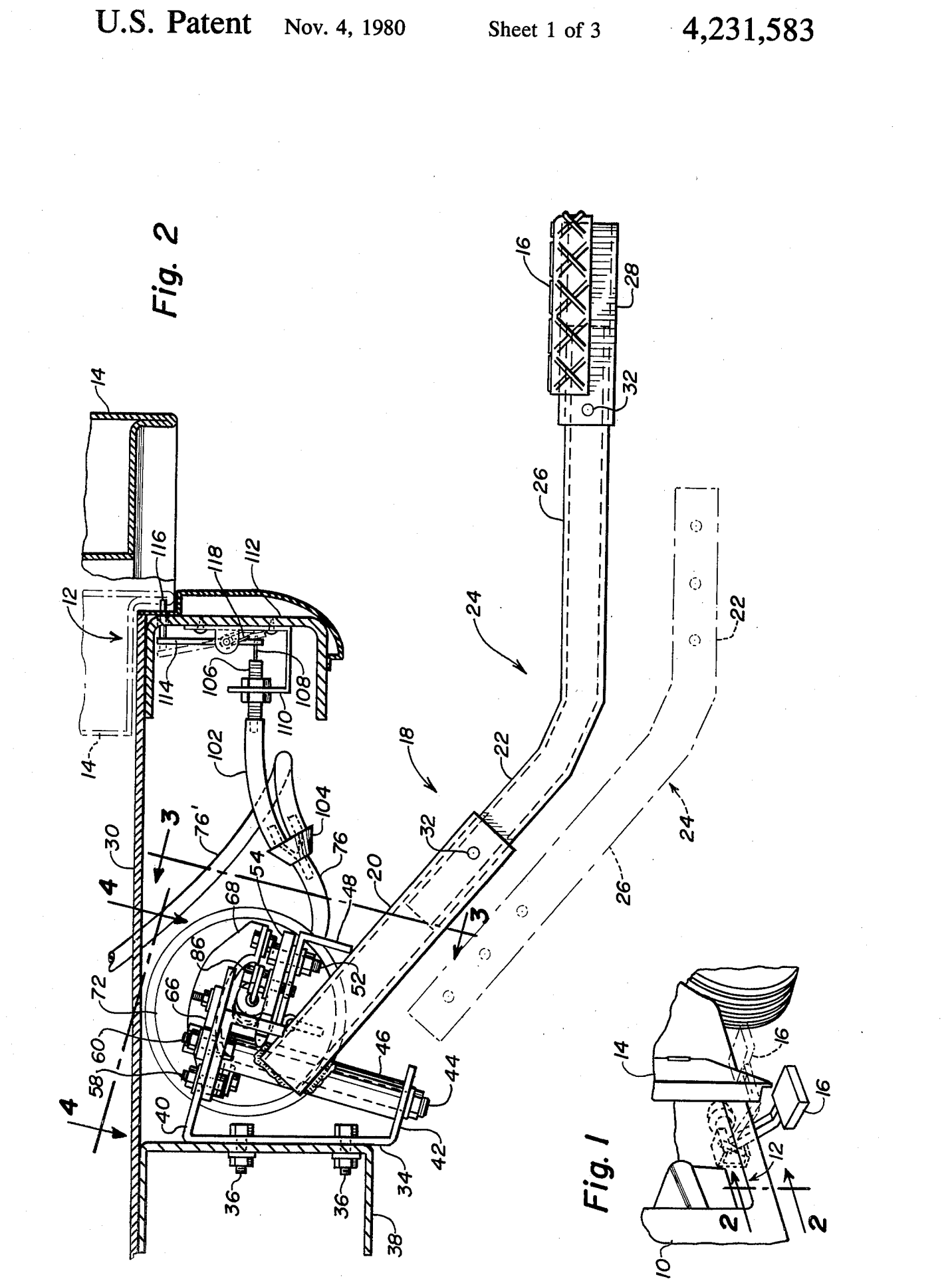
Figure 3:
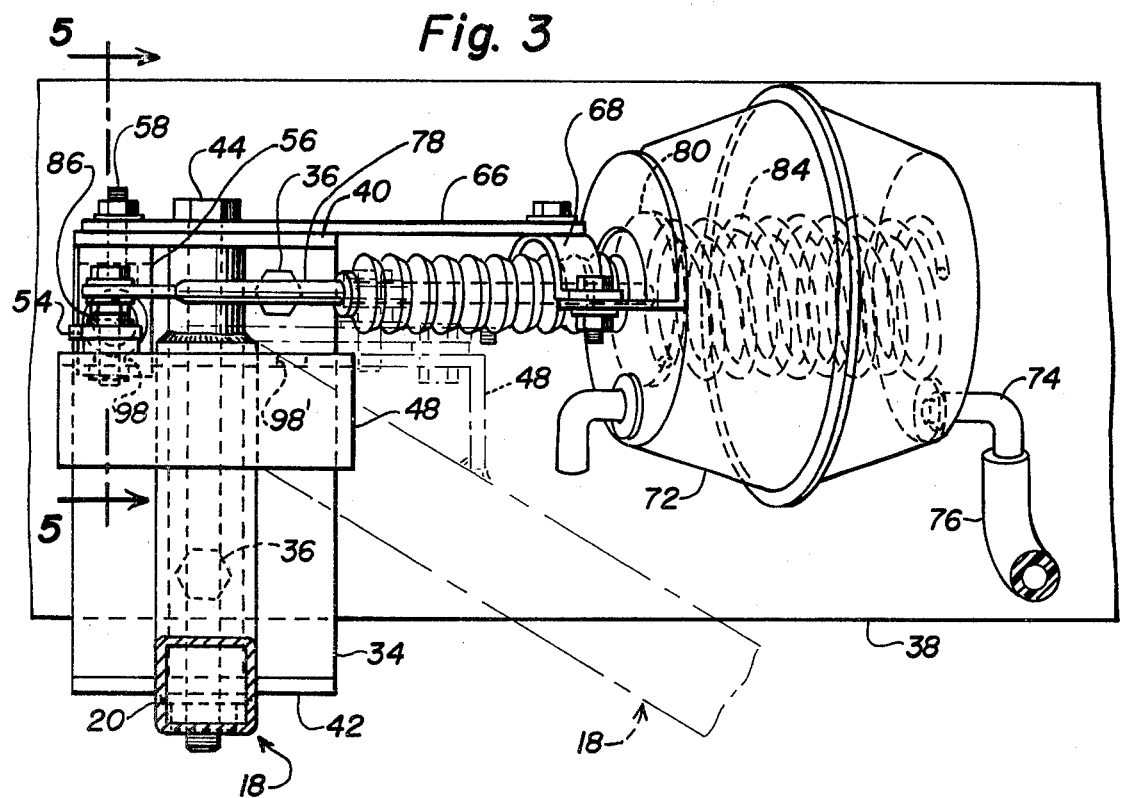
FIG. 3 is a fragmentary vertical side elevation of the supporting and operating mechanism of the auxiliary step shown in FIG. 2, as seen on the line 3—3 thereof, the arm which supports the step being shown in projected position in full lines, and in phantom, said arm being shown in fragmentary manner in retracted position.

Referring to the drawings, there is shown fragmentarily in perspective in FIG. 1, a typical installation of the projectable step for a vehicle which embodies the principles of the present invention. In said figure, a body 10 of an exemplary automotive vehicle, such as a bus, van, or similar vehicle, is shown adjacent a door opening 12, the door 14 being illustrated in partly open positions and the step 16 comprising an essential part of the present invention being shown in full lines in laterally extended operative position, while in phantom, the step is shown disposed beneath the body of the vehicle in retracted, inoperative position. For details of the supporting and actuating mechanism for the step 16, attention now is directed to the succeeding figures, especially FIGS. 2–4, for an understanding of the mechanism comprising the present invention.

The step 16 is actually a tread member of suitable size which is detachably connected to one end of an articulated arm 18 which is comprised of an inner member 20, which preferably is a socket member and, for convenience, preferably is square or rectangular in cross-section to receive a complementary shorter end portion 22 of a second or outer arm member 24 that includes a longer outer portion 26. The step 16 also includes a socket member 28 which receives the outer end of the longer outer portion 26 of the outer arm member 24, as shown in full lines in FIG. 2.

The shorter end portion 22 and longer outer portion 26 of the outer arm member 24 are disposed at a dihedral angle with respect to each other to permit the disposing of the step 16 at a desired level below the sill of the door opening 12, for example, as shown in FIG. 2, the sill being coextensive with the floor 30 of the body 10 of the vehicle. Hence, it will be seen that when the outer arm member 24 is disposed as shown in full lines in FIG. 2, the step 16 will be at a certain level below the sill of the door opening 12, but when the outer arm member 24 is reversed end-for-end, as shown in phantom in FIG. 2, the step 16 can be disposed at a lower level than shown in full lines in FIG. 2, but may be at a different extent of projection laterally, depending upon how far the opposite ends of the member 24 are disposed respectively in the inner socket member 20 and the socket member 28 on the step 16. It also will be understood that any adjustable extension of either end of the member in the respective sockets therefor is controlled by appropriate means such as either a suitable arrangement of threaded openings 32, respectively formed in said sockets for the reception of set screws or the like, or a series of holes may be formed either in said sockets or in the opposite ends of the arm member 24 for the reception of bolts, not shown, which can extend therethrough for the described purposes.

The composite arm 20, 24 essentially is supported by a bracket 34, which has appropriate holes therein through which bolts 36 extend and also extend through aligned openings in the chassis frame member 38, for example. The bracket 34 is provided with a pair of parallel extensions 40 and 42, extension 40 being longer than extension 42, as best shown in FIG. 2. Aligned holes are formed respectively in the extensions 40 and 42 for purposes of receiving a pivot bolt 44, which also extends through a sleeve 46 to which the inner member 22 of arm 18 is affixed, such as by welding. It also will be seen that the axis of the pivot bolt 44 is at an acute angle to the vertical, such as the disposition of the face of the channel-shaped chassis member 38 to which the bracket 34 is affixed. This is for purposes of enabling the arm 18 for the step 16 to move downwardly and outwardly from the exemplary phantom position thereof, shown in FIG. 1, beneath the body 10 of the vehicle and, conversely, to be elevated from its lower, extended position, as shown in full lines in FIG. 2, to the phantom position shown in FIG. 1.

Figure 5:
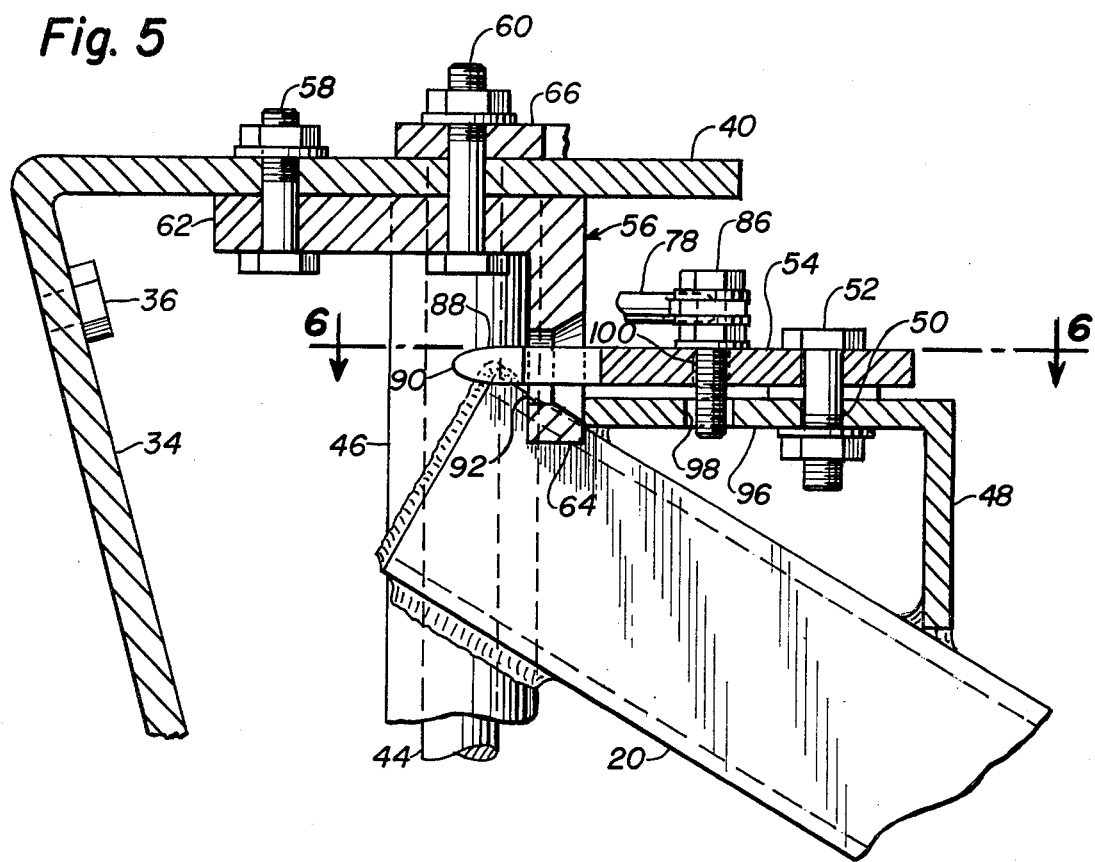
FIG. 5 illustrates on a still larger scale than in the preceding figures, fragmentary and vertically sectioned portions of the supporting bracket of the mechanism, as well as details of the latch thereof.

Referring particularly to FIG. 5, it will be seen that the upper and inner end of the inner member 20 of arm 18 has affixed thereto, a latch support 48 in the form of a right-angled bracket, the horizontal upper portion thereof having a hole 50 through which extends pivot bolt 52 for pivotally connecting one end of latch 54 to the bracket 48. The opposite ends of the latch support 48 are affixed to the inner member 20 by suitable means, such as welding. Also, a keeper member 56, which is engaged as explained hereinafter, by the outer end of latch 54, is affixed to the extension 40 of bracket 34 by means of a pair of bolts 58 and 60, said bolts extending through an arm 62 of keeper member 56 and said keeper member also including a downwardly extending leg 64.

Also supported by the extension 40 of bracket 34 is another extension 66, such as a metal arm, to the outer end of which is secured a yoke 68, the outer ends of which are connected to a pair of ears 70 that project from one end of a vacuum cylinder 72. Affixed to one end of the cylinder 72 is a vacuum nozzle 74, to which one end of a vacuum hose 76 is connected, the opposite end of the vacuum hose being connected to a vacuum manifold, for example, not shown, of the engine of the vehicle which, in conventional manner, develops a negative pressure during the operation of the engine.

Figure 4:
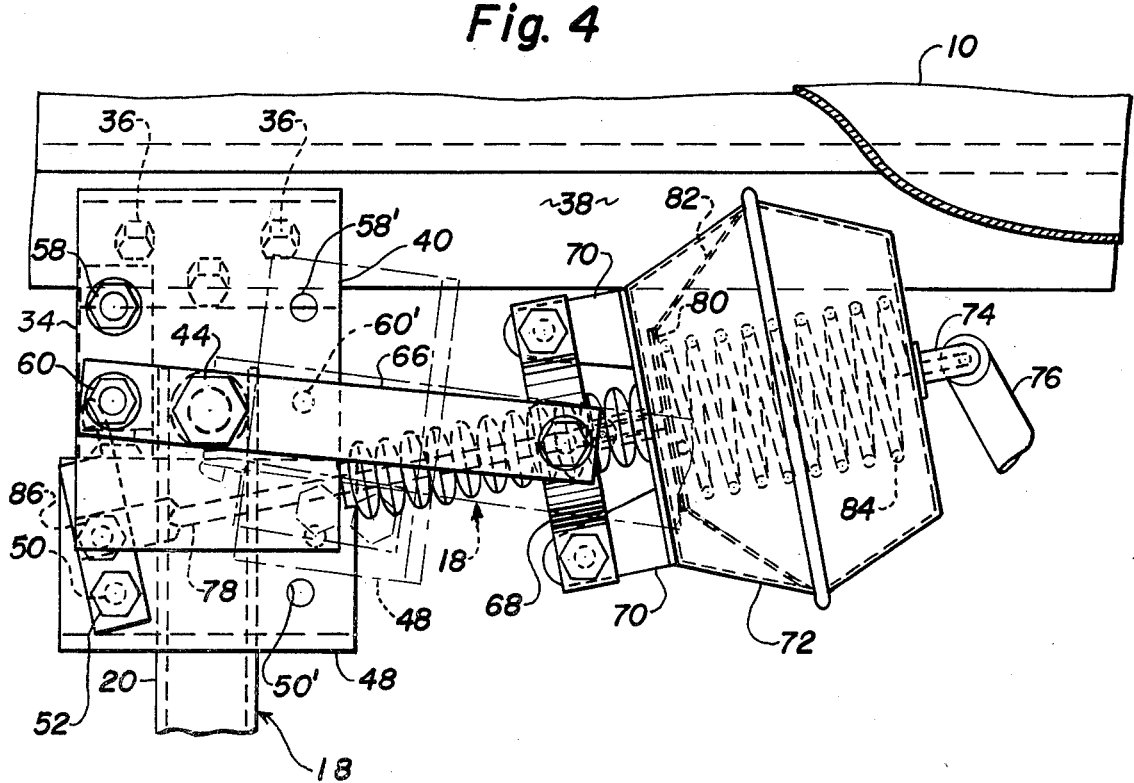
FIG. 4 is a fragmentary plan view of the mechanism shown in FIG. 3, generally as seen on the line 4—4 of FIG. 2, the supporting arm for the step being shown in projected position in full lines and, in phantom, being shown in retracted position.

Projecting from the vacuum cylinder 72 is a conventional plunger rod 78, the inner end thereof being affixed to the piston disc 80, see FIG. 4, which also is connected to a conventional flexible diaphragm 82 within the vacuum cylinder 72. Extending between the piston disc 80 and the end of the vacuum cylinder 72 to which the nozzle 74 is connected, is a compression spring 84 which acts against the piston disc 80 and the plunger rod 78 to force it toward the left, as viewed in FIGS. 3 and 4, when vacuum is not applied to the cylinder 72. The outer end of the plunger rod 78 is pivotally connected to a pivot pin, such as bolt 86, see FIG. 5, for purposes of actuating latch 54.

Figure 6:
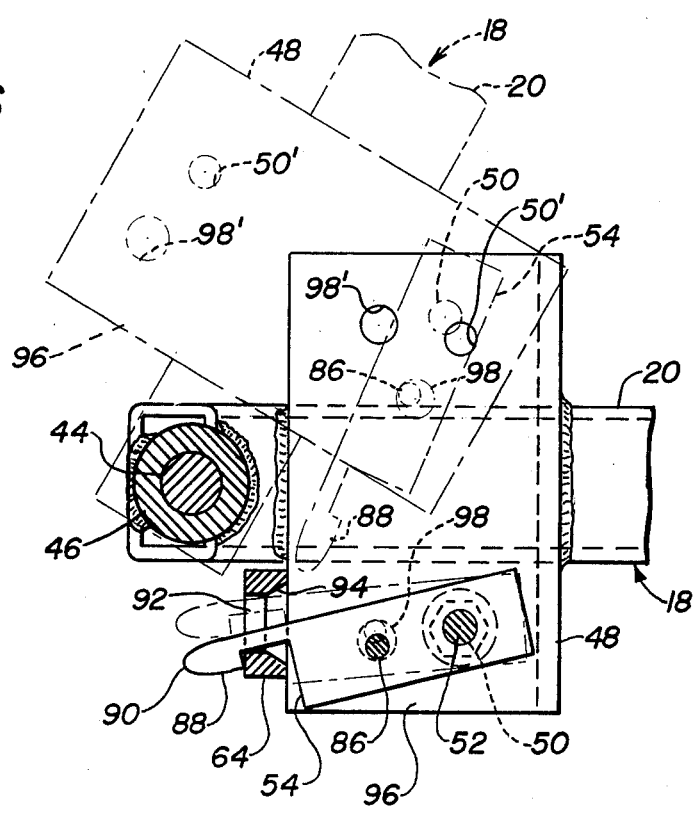
FIG. 6 is a fragmentary plan view of the mechanism of FIG. 5 as seen on line 6—6 thereof.

In view of the fact that the latch 54 is pivotally supported by the inner end of the compound arm 18, when the spring 84 projects the plunger rod 78 outwardly, toward the left as viewed in FIGS. 3 and 4, such movement will extend the arm 18 and the step 16 supported thereby from the retracted position, such as shown in phantom in FIG. 1 to the extended position also shown in full lines in FIG. 1 and also as shown in full lines in FIGS. 3 and 4 with respect to the arm 18. Accordingly, said spring, when no vacuum is applied to the cylinder 72, will move and hold the arm 18 and its step in said extended lateral, operative position and to insure that it will remain in that position, either when the door 14 is open, or when the engine is not running and therefore, no vacuum is available, the latch 54 is operative to maintain said arm and step in said extended operative position by the following means:

Referring particularly to FIGS. 4–6, it will be seen that the end of the latch 54 opposite the pivoted end is formed with a latching member 88, which has a cam-shaped outer end 90 thereon for purposes of being cammingly received within an opening 92 which is a little larger in cross-sectional dimension than that of the latching member 88 and preferably is provided with a flared inner end 94, whereby when the arm 18 is moved from the retracted, inoperative position to the extended, lateral operative position, the movement of the latch 54 from the exemplary phantom position shown in FIG. 6 to the full line position will project the latching member 88 through the opening 92 in the downward leg 64 of the keeper 56 until it assumes the full line position shown in FIG. 6 and thereby, latches the arm 18 in said lateral, projected and operative position. Movement of the latch 54 about the pivot 52 is limited by means of the horizontal portion 96 of latch support 48, having a hole or opening 98 therein which is of a larger diameter than that of the bolt 86 and the hole 100 into which it is threaded. Accordingly, movement of the lower end of the pivot bolt 86 relative to the hole 98 permits the aforementioned movement of the latching member 88 against one side of the rim of the opening 92 in keeper 64. Further, because of the continuous pressure of the spring 84 upon the plunger rod 78, said pressure will continue to releasably maintain the latching member 88 in the latched positioned with respect to the opening 92 in the keeper leg 64.

The operation of the present invention is such that when the engine is running and vacuum is being applied to the hose or conduit 76 leading from the vacuum cylinder 72 and the door 14 is moved from the open position, for example, shown in full lines in FIG. 2, to the closed position thereof, shown in phantom, vacuum will be applied to the cylinder 72 and when this occurs, the plunger rod 78 will be moved toward the right, as viewed in FIGS. 3 and 4, against the action of the spring 84. When such movement is initiated, the first portion thereof will move the latch 54 clockwise, as viewed in FIG. 6, and thereby move the latching member 88 from the full line position to the phantom adjacent thereto in said figure, whereby the latching member 88 may be withdrawn from the opening 92 and further movement of the plunger rod 88, as aforesaid, will move the arm 18 about the axis of pivot bolt 44, counterclockwise, from the full line position shown in FIG. 6, for example, to the retracted, inoperative position of the step 16 beneath the body 10 of the vehicle, as shown in FIG. 1 and also as partially shown in FIGS. 3, 4 and 6. Therefore, when the door 14 has been closed and the engine is running and it is desired to move the vehicle, it will be seen that the vacuum applied to the cylinder 72 by the vacuum source from the engine will continue to maintain the arm 18 and step 16 in said retracted position as long as the door remains closed and the engine is running. However, when either the engine is stopped and/or the door 14 is opened, vacuum within the cylinder 72 is released by means of an auxiliary conduit 102, which is connected to one port of a dual branch fitting 104 that has one nozzle to which the outer end of conduit 76 is connected as shown in FIG. 2, and a pair of fittings on the opposite end to which respectively the auxiliary conduit 102 and conduit 76' are connected, the conduit 76' leading from the vacuum source of the engine, not shown. The opposite end of the auxiliary conduit 102 is connected to a vacuum release valve 106 having a projecting operating stem 108, the valve 106 being supported by a suitable bracket 110 affixed to a body frame member 112, which is shown in vertical section in FIG. 2. Any appropriate means for operating the valve stem 108 may be employed, such as the pivoted lever 114, which is engaged by plunger 116, the outer end of which projects beyond the body frame member 112, as shown in full lines in FIG. 2. The same is maintained in said position, such as by a suitable U-shaped spring 118, or otherwise, shown in FIG. 2. Hence, when the door 14 is moved to the phantom, closed position, the plunger 116 will move inwardly to dispose the lever 114 in the phantom position and in which the lower end of the lever moves counterclockwise to permit the plunger 108 to move the valve closing position and thereby, restore the vacuum to the cylinder 72 through the interconnected hoses 76 and 76'. It will be understood that the vacuum release valve 106, for example, is of the type commonly used in controlling the inflation of automobile tires and is open when the plunger is moved inward and closed when the plunger moves outward.

When the door 14 is moved to open position, the lever 114 moves to the full line position in which the lower end thereof depresses the valve stem 108, opens valve 106 and releases the vacuum from the engine even when the engine is running and, further, when the engine is stopped, no vacuum is present and under both of these situations, the vacuum cylinder is rendered ineffective and the spring 84 functions to move the arm 24 and the step 16 to the extended, operative positions thereof, in which position the same will remain until the engine is again started to provide vacuum and the door 14 is moved to the closed position thereof.

From the foregoing, it will be seen that the present invention provides a rugged, durable and fool-proof device for automatically moving an auxiliary step from a retracted, inoperative position to a projected, operative position, one movement being effected by a spring, and the opposite movement being caused by a vacuum cylinder.

In order that the present invention may be equally adaptable for mounting upon the conventional passenger side or conventional driver's side of a vehicle, such as a bus, van, or the like, it is readily understandable that the bracket 34 may be mounted upon the chassis frame member on either side of the vehicle, as desired. Accordingly, suitable holes to accommodate the bolts 36 are provided on such side of the vehicle upon which it is desired to mount the auxiliary step 16. Due, however, to the particular function of the latch 54 with respect to the keeper extension 66 and the required support of the vacuum cylinder 72 relative to the extension 40 of bracket 34, it is necessary to provide means to change the positions of the bolts 58 and 60 with respect to the extension 40 when changing the mounting, for example, of the apparatus from one side of the vehicle to the other. Similarly, the holes 50 and 98 in the horizontal portion 96 of latch support 48 have to be changed under such circumstances. Accordingly, as seen in FIG. 6, the horizontal portion 96 of latch support 48 is provided with a duplicate set of holes 98' and 50' for purposes of reverse mounting of the latch 54 thereon and, correspondingly, the upper extension 40 of the bracket 34, as shown best in FIG. 4, is provided with a duplicate set of holes 58' and 60', respectively, for the bolts 60 and 58, when the apparatus is shifted from one side to the other of the vehicle, thus, rendering the apparatus universal with respect to the opposite sides of a vehicle and thereby extending the use thereof, both from the standpoint of practicality and convenience.

The fitting 104 also has a check valve therein, not shown, which operates to prevent vacuum from bleeding from the cylinder 72 when, for example, the engine speed is increased suddenly which tends to decrease vacuum in the system and, if sufficient to do so, could cause the step to be extended to the outer operative position while the vehicle is moving. The check valve prevents such occurrence and renders the system safe under such circumstances.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A step assembly for a vehicle having a chassis frame and a door opening outward from one wall of the body of the vehicle and means to develop a source of vacuum when the engine of the vehicle is running, said assembly comprising in combination, a supporting bracket, means to connect said bracket to said chassis frame adjacent said door, an arm pivotally connected at one end to said bracket and movable within a generally horizontal plane, a step connected to the opposite end of said arm, said arm being adapted to pivot relative to said bracket between a retracted position beneath the body of the vehicle and an operative position extending laterally from said frame in alignment with said door, a vacuum cylinder and plunger rod unit supported adjacent said bracket and connectable to said source of vacuum, a compression spring within said cylinder operable normally to project the outer end of said plunger rod outward from said cylinder, means interconnecting said outer end of said plunger rod to said arm for actuation of said arm and step, a latch carried by said arm and engageable with a keeper on said bracket when said arm is extended to releasably secure the same in said extended position, said latch being connected to said plunger rod and movable thereby to unlatched position prior to moving said arm and step to projected position, and a vacuum release valve movable to closed position by said door when the same is closed to cause vacuum to act upon said cylinder to move said plunger rod inward initially to unlatch said latch and then move said arm and step to retracted position and said door when opened moving said release valve to open position and thereby release the vacuum and permit said compression spring to reverse the movement of said plunger rod and project said arm and step to operative position and engage said latch with said keeper.

2. The step assembly according to claim 1 in which said bracket has a pivot for said one end of said arm which extends upward and outward at an acute angle relative to said chassis frame and said arm having an inner end portion extending outward and downward relative to said pivot when said arm is extended and an outer end portion extending substantially horizontally from said inner end portion and connected to said step to support the same horizontally, said angularity of said pivot enabling said step to be raised by said arm when retracted to dispose it at a level above the extended position of said step.

3. The step assembly according to claim 2 wherein said arm is articulated and comprises a socket on said inner end portion which telescopically receives one end of said outer end portion adjustably to provide a desired elevation of said step below that of said door opening of the vehicle body.

4. The step assembly according to claim 3 in which said outer end portion comprises two portions respectively at a dihedral angle to each other, one of said portions being longer than the other and each portion selectively being positionable telescopically within said socket of said inner end portion to provide a plurality of different elevations of the portion projecting outermost from said socket, and means detachable securing said step to the outermost end of said outer end portion.

5. The step assembly according to claim 1 in which said latch is elongated and pivotally connected at one end to said arm adjacent the pivoted end thereof, and means connected said outer end of said plunger rod directly and pivotally to said latch intermediately of the ends thereof, whereby said rod actuates said arm by the connection thereof to said latch.

6. The step assembly according to claim 5 in which the end of said latch opposite the pivot thereof has a latching member and said assembly further including means limiting the movement of the outer end of said latch and latching member between engagement with and separation from said keeper on said bracket.

7. The step assembly according to claim 6 in which said pivoted end of said arm extends downward and outward from the pivot therefor, and said assembly further including a latch support on said arm adjacent the pivoted end thereof, pin means pivotally connecting said one end of said latch to said support, said movement-limiting means comprising an opening in said support which receives an extension on the pivotal connection of said plunger rod to said latch, said extension being of smaller cross-section than the cross-dimension of said opening in said support, and said keeper comprising a keeper member fixed to said supporting bracket and engageable by the latching member of said latch.

8. The step assembly according to claim 7 in which said keeper member has a hole of greater cross-sectional dimension than said latch member and through which said latch member is extendable for engagement with the rim of said hole when the latch membe is in latched position.

9. The step assembly according to claim 8 in which said compression spring within said vacuum cylinder when pushing said plunger rod outwardly also acts upon said latch to push the same and thereby project the latch member thereon into latching position with said keeper, and said latch member having a cam surface thereon engageable with the rim of said hole in said keeper during such movement of said plunger rod by which said latch member is cammed into latching engagement with said keeper and said spring being arranged to retain said latch member in said latched engagement with the rim of the hole in said keeper when said arm is held in projected position by said spring.

10. The step assembly according to claim 7 in which said latch support is provided with a duplicate opening and the hole through which the pivot for said pivoted end of said latch extends, said duplicates respectively being adjacent opposite ends of said support and an additional set of holes on said bracket adjacent opposite ends thereof and respectively adapted to receive bolts to connect said keeper member to said bracket, said duplicates and sets of holes respectively enabling said assembly to be mounted selectively on either side of a vehicle by employing the desired set of openings and holes provided therefor.

* * * * *